US007928992B2

(12) United States Patent
Liu et al.

(10) Patent No.: US 7,928,992 B2
(45) Date of Patent: Apr. 19, 2011

(54) SYSTEM AND METHOD FOR TRANSPARENT OBJECT RENDERING

(75) Inventors: Dakai Liu, Eastwood (AU); Thevan Raju, Ryde (AU); Abhijit Mandal, Ryde (AU); Derek Seow, Earlwood (AU); Leopold Bobrowski, West Pennant Hills (AU); Chaminda Weerasinghe, Bella Vista (AU)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 990 days.

(21) Appl. No.: 11/755,477

(22) Filed: May 30, 2007

(65) Prior Publication Data

US 2008/0297534 A1 Dec. 4, 2008

(51) Int. Cl.
*G09G 5/02* (2006.01)
(52) U.S. Cl. .................... 345/592; 345/629; 715/275
(58) Field of Classification Search .......... 345/530–574, 345/592, 629–641; 715/275
See application file for complete search history.

(56) References Cited

U.S. PATENT DOCUMENTS

| 5,509,115 | A | * | 4/1996 | Butterfield et al. ............ 345/418 |
|---|---|---|---|---|
| 5,640,496 | A | * | 6/1997 | Hardy et al. ................... 345/421 |
| 5,675,773 | A | * | 10/1997 | Devic ............................ 345/522 |
| 5,724,494 | A | * | 3/1998 | Politis ........................... 345/592 |
| 6,005,584 | A | * | 12/1999 | Kitamura et al. .............. 345/582 |
| 6,006,013 | A | * | 12/1999 | Rumph et al. ................. 358/1.15 |
| 6,151,030 | A | * | 11/2000 | DeLeeuw et al. ............. 345/592 |
| 6,289,364 | B1 | | 9/2001 | Borg et al. |
| 6,304,266 | B1 | * | 10/2001 | Li ................................... 345/424 |
| 6,362,818 | B1 | * | 3/2002 | Gardiner et al. .............. 345/421 |
| 6,466,210 | B1 | | 10/2002 | Carlsen et al. |
| 6,879,328 | B2 | * | 4/2005 | Deering ......................... 345/592 |
| 6,961,067 | B2 | | 11/2005 | Moore |
| 7,126,578 | B1 | | 10/2006 | Hamburg |
| 7,130,073 | B2 | * | 10/2006 | Kumar et al. ................. 358/1.16 |
| 7,154,503 | B2 | | 12/2006 | Yuan |
| 2001/0015820 | A1 | * | 8/2001 | Conrad et al. ................ 358/1.15 |
| 2002/0039101 | A1 | * | 4/2002 | Fernandez et al. ............ 345/581 |
| 2002/0093505 | A1 | * | 7/2002 | Hill et al. ....................... 345/543 |
| 2002/0184238 | A1 | * | 12/2002 | Chylla ........................ 707/104.1 |
| 2003/0117405 | A1 | * | 6/2003 | Hubrecht et al. ............. 345/543 |
| 2004/0114794 | A1 | | 6/2004 | Vlasic et al. |
| 2004/0189656 | A1 | | 9/2004 | Moore |
| 2004/0196483 | A1 | * | 10/2004 | Jacobsen ...................... 358/1.13 |
| 2005/0116955 | A1 | | 6/2005 | Cao |
| 2005/0122337 | A1 | | 6/2005 | Chen |
| 2005/0132264 | A1 | * | 6/2005 | Joshi et al. ................. 715/500.1 |
| 2005/0200867 | A1 | | 9/2005 | Faggion |
| 2005/0213114 | A1 | * | 9/2005 | Clark et al. .................... 358/1.1 |
| 2005/0248790 | A1 | | 11/2005 | Ornstein et al. |

(Continued)

*Primary Examiner* — I-Chan Yang
(74) *Attorney, Agent, or Firm* — SoCal IP Law Group LLP; Steven C. Sereboff; Jonathan Pearce

(57) ABSTRACT

The subject application is directed to a system and method for transparent object rendering. An electronic document, inclusive of a plurality of objects, is first received. The electronic document is then parsed so as to generate a transparency table. The generated table includes entries corresponding to transparency characteristics of each of the objects. Each object of the received electronic document is then processed in accordance with a corresponding transparency table entry. The system further comprises means adapted for generating a scan-line representation of each of the plurality of objects, the scan-line representation including a scan-line corresponding to an associated backdrop and a scan-line corresponding to associated pixel data. The received electronic document is thereby rendered so as to generate a rendered document.

15 Claims, 10 Drawing Sheets

U.S. PATENT DOCUMENTS

| | | |
|---|---|---|
| 2006/0001679 A1 | 1/2006 | Hamburg |
| 2006/0046844 A1* | 3/2006 | Kaneko .......................... 463/32 |
| 2006/0066621 A1 | 3/2006 | Herceg et al. |
| 2006/0114263 A1 | 6/2006 | Moore |
| 2006/0192983 A1 | 8/2006 | Groarke et al. |
| 2006/0221094 A1 | 10/2006 | Yuan |
| 2006/0227150 A1 | 10/2006 | Yuan |
| 2006/0244748 A1 | 11/2006 | Long et al. |
| 2006/0268000 A1* | 11/2006 | Long .............................. 345/592 |
| 2006/0290705 A1* | 12/2006 | White et al. .................. 345/522 |
| 2007/0216696 A1* | 9/2007 | Capper et al. ................ 345/543 |
| 2008/0084572 A1* | 4/2008 | Capper et al. ................ 358/1.13 |

* cited by examiner

200
SYSTEM AND METHOD FOR TRANSPARENT OBJECT RENDERING

BACKGROUND OF THE INVENTION

The subject application is directed to generally to rendering of electronic documents. The subject application is particularly applicable to memory efficient rendering of objects having attributes, such as opacity information, embedded therein.

Electronic document are currently generated by many software applications, such as word processors, image processing, photo editing, computer aided design, scanning, facsimile transmission, drawing, and the like. Many such applications support rendering to generate tangible document output. Common outputs include pixel based or bitmapped rendering on laser printers, ink jet printers, or other dot matrix output devices.

Newer generation document output formats include more information so as to be descriptive of increasingly complex attributes, which need to be processed by document rendering devices. By way of example, Microsoft WINDOWS VISTA currently employs extensible markup language (XML) in its implementation. WINDOWS VISTA further employs an XML page specification (XPS) as its printer format. The XPS format specifies transparent objects to be rendered within nested instances of Canvases as individual elements.

Any XPS file can potentially contain transparent objects. However, there is no indication at the start of a page whether the current page contains transparent objects. Transparency is determined only upon such point as a transparent object is encountered. Thus, each print file must be treated as a transparency page. A raster image processor associated with a typical imaging device possesses a finite amount of memory making it difficult or impossible to treat each print page as a transparency page.

SUMMARY OF THE INVENTION

In accordance with one embodiment of the subject application, there is provided a system and method for rendering of electronic documents.

Further, in accordance with one embodiment of the subject application, there is provided a system and method for memory efficient rendering of objects having attributes, such as opacity information, embedded therein.

Still further, in accordance with one embodiment of the subject application, there is provided a transparent object rendering system. The system comprises means adapted for receiving an electronic document inclusive of a plurality of objects. The system also comprises parsing means adapted for parsing a received electronic document, the parsing means including means adapted for generating a transparency table having entries corresponding to transparency characteristics of each of the plurality of objects. The system further comprises means adapted for rendering the received electronic document by processing of each of the plurality of objects in accordance with a corresponding entry in the transparency table.

In one embodiment of the subject application, the system further comprises means adapted for generating a scan-line representation of each of the plurality of objects, the scan-line representation including a scan-line corresponding to an associated backdrop and a scan-line corresponding to associated pixel data.

In another embodiment of the subject application, the system also comprises means adapted for generating a first pixel map corresponding to color data of each object and means adapted for generating a second pixel map corresponding to opacity data of each object.

In yet another embodiment of the subject application, the system comprises status means adapted for receiving data representative of available memory associated with a document rendering operation and means adapted for selectively re-rendering objects in accordance with an output of the status means.

In a further embodiment of the subject application, the system includes tracking means adapted for tracking pixels for which a rendering function has been performed and means adapted for controlling a rendering operation in accordance with an output of the tracking means.

In another embodiment of the subject application, the transparency table is comprised of a stack, and the parsing means includes means adapted for iteratively generating a stack entry for each object, including objects that are nested in another object of the plurality thereof.

In another embodiment of the subject application, the system further comprises means adapted for generating a scan-line representation of opacity mask object by means of generating two transparency groups, one containing the object to be rendered and the other containing the alpha mask. Opacity mask in XPS is a special kind of brush, where instead of using the brush color, the opacity mask gives the opacity value at a certain pixel location.

Still further, in accordance with one embodiment of the subject application, there is provided a method for transparent object rendering in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for rendering of electronic documents. In particular, the subject application is directed to a system and method for memory efficient rendering of objects having attributes, such as opacity information, embedded therein. It will become apparent to those skilled in the art that the system and method described herein are suitably adapted to a plurality of varying electronic fields involving memory efficiency, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
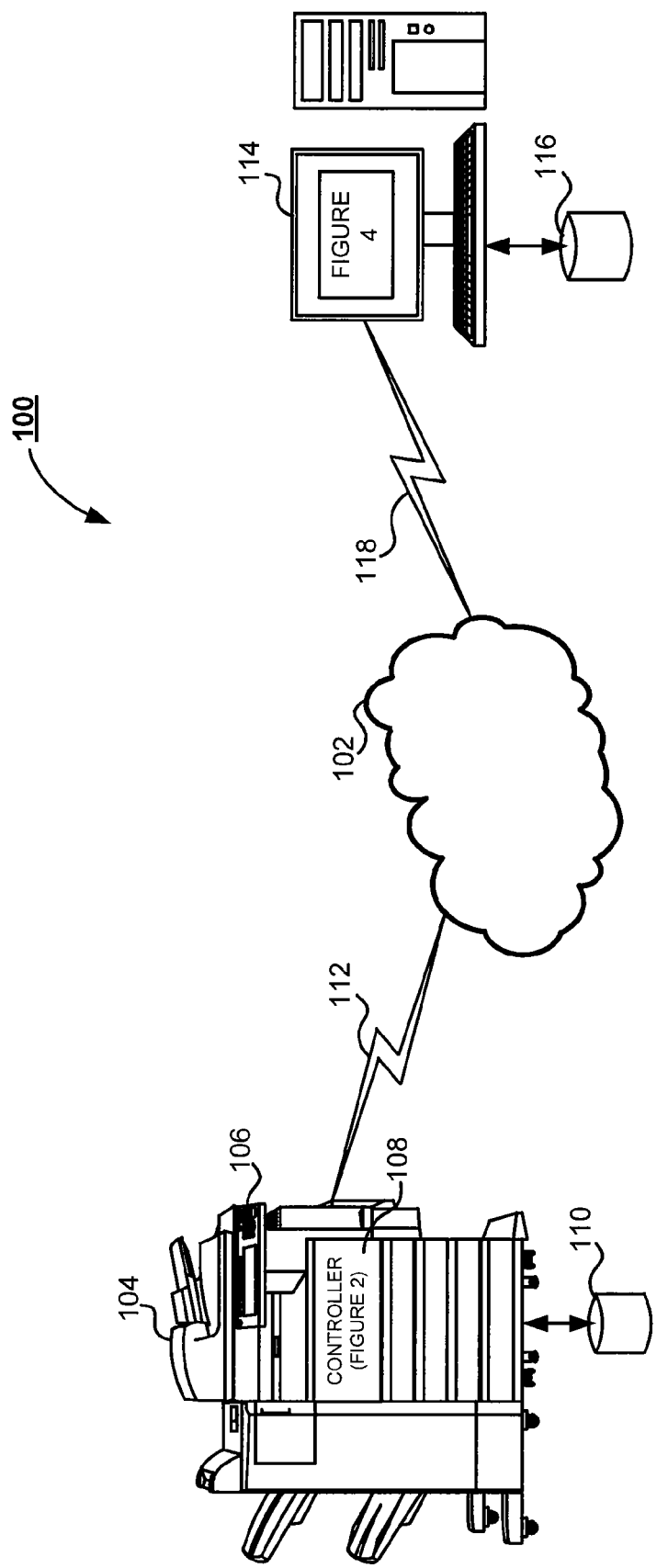
FIG. 1 is an overall diagram of a transparent object rendering system according to one embodiment of the subject application.

Referring now to FIG. 1, there is shown an overall diagram of a transparent object rendering system 100 in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11 g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for transparent object rendering of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store a document data, image data, pixel map data, opacity data, color data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a user device 114, in data communication with the computer network 102 via a communications link 118. It will be appreciated by those skilled in the art that the user device 114 is shown in FIG. 1 as a personal computer for illustration purposes only. As will be understood by those skilled in the art, the user device 114 is representative of any personal computing device known in the art, including, for example and without limitation, a computer workstation, a laptop computer, a personal data assistant, a web-enabled cellular telephone, a smart phone, a proprietary network device, or other web-enabled electronic device. The communications link 118 is any suitable channel of data communications known in the art including, but not limited to wireless communications, for example and without limitation, Bluetooth, WiMax, 802.11a, 802.11b, 802.11 g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102. The functioning of the user device 114 will better be understood in conjunction with the block diagrams illustrated in FIG. 4, explained in greater detail below.

Communicatively coupled to the user device 114 is a data storage device 116. In accordance with the preferred embodiment of the subject application, the data storage device 116 is any mass storage device known in the art including, for example and without limitation, magnetic storage drives, a hard disk drive, optical storage devices, flash memory devices, or any suitable combination thereof. In the preferred embodiment, the data storage device 116 is suitably adapted to store an operating system, compact markup page representation data, document output drivers, applications, document data, image data, electronic database data, or the like. It will be appreciated by those skilled in the art that while illustrated in FIG. 1 as being a separate component of the system 100, the data storage device 116 is capable of being implemented as internal storage component of the user device 114, such as, for example and without limitation, an internal hard disk drive, or the like.

Figure 2:
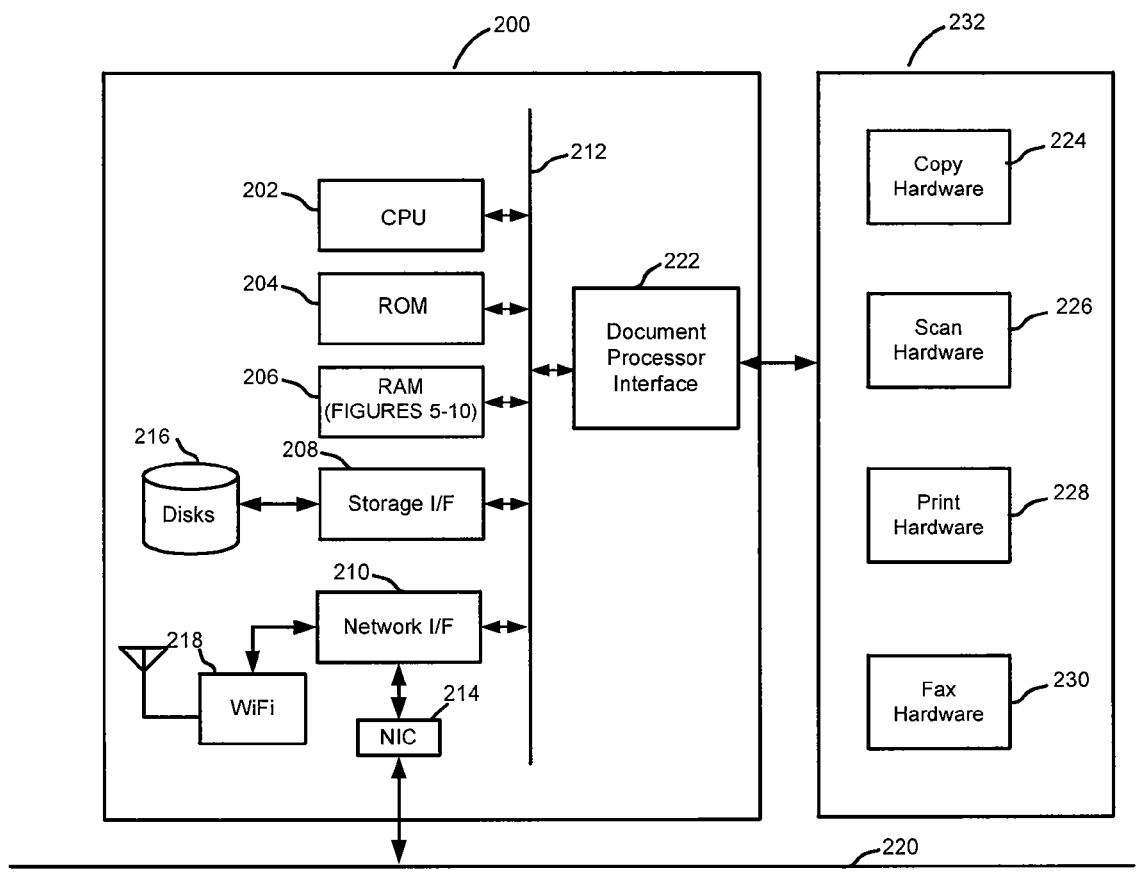
FIG. 2 is a block diagram illustrating controller hardware for use in the transparent object rendering system according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
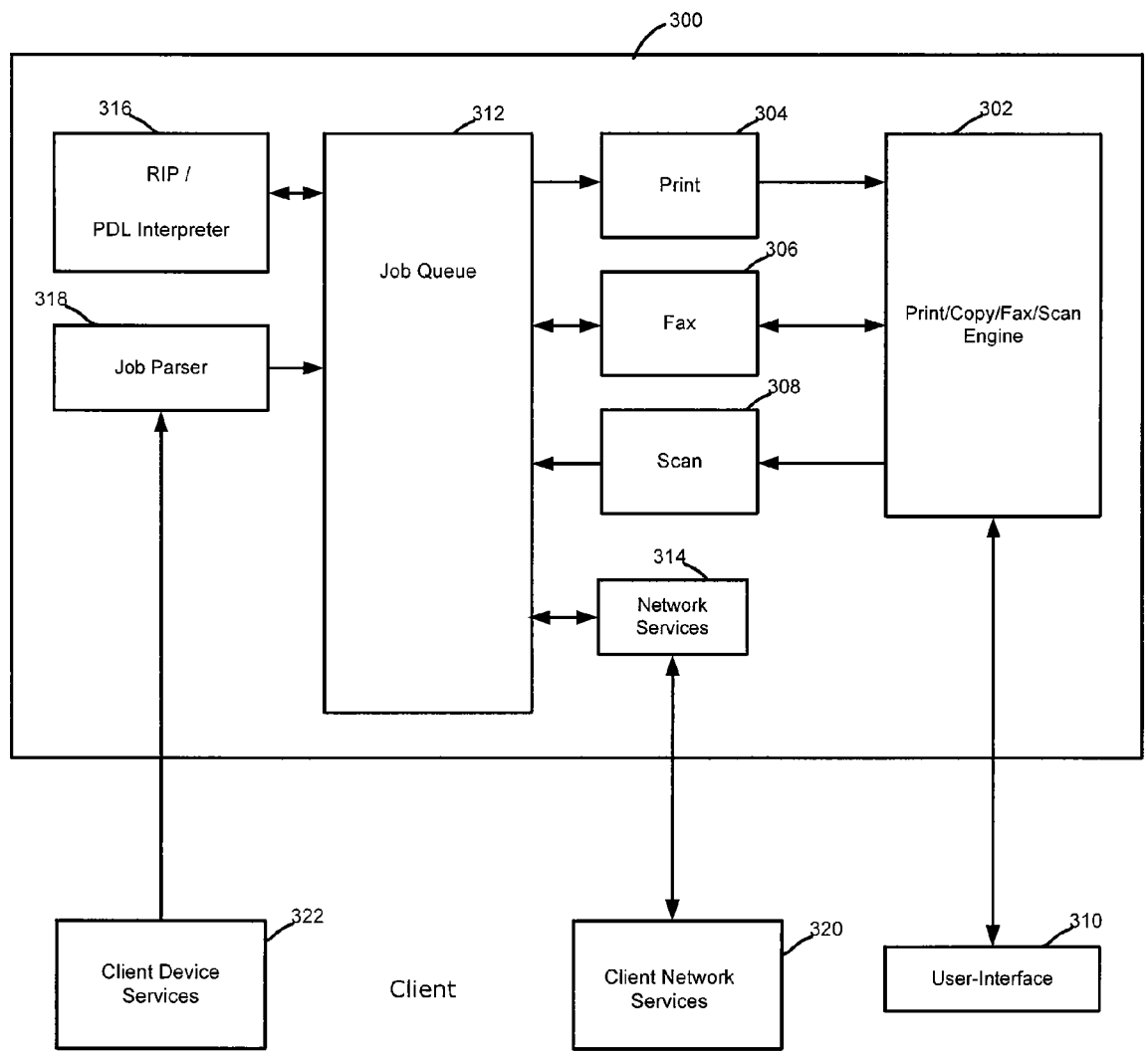
FIG. 3 is a functional diagram illustrating the controller for use in the transparent object rendering system according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The Parser 318 functions to interpret a received electronic document file and relay it to the job queue 312 for handling in connection with the afore-described functionality and components.

Figure 4:
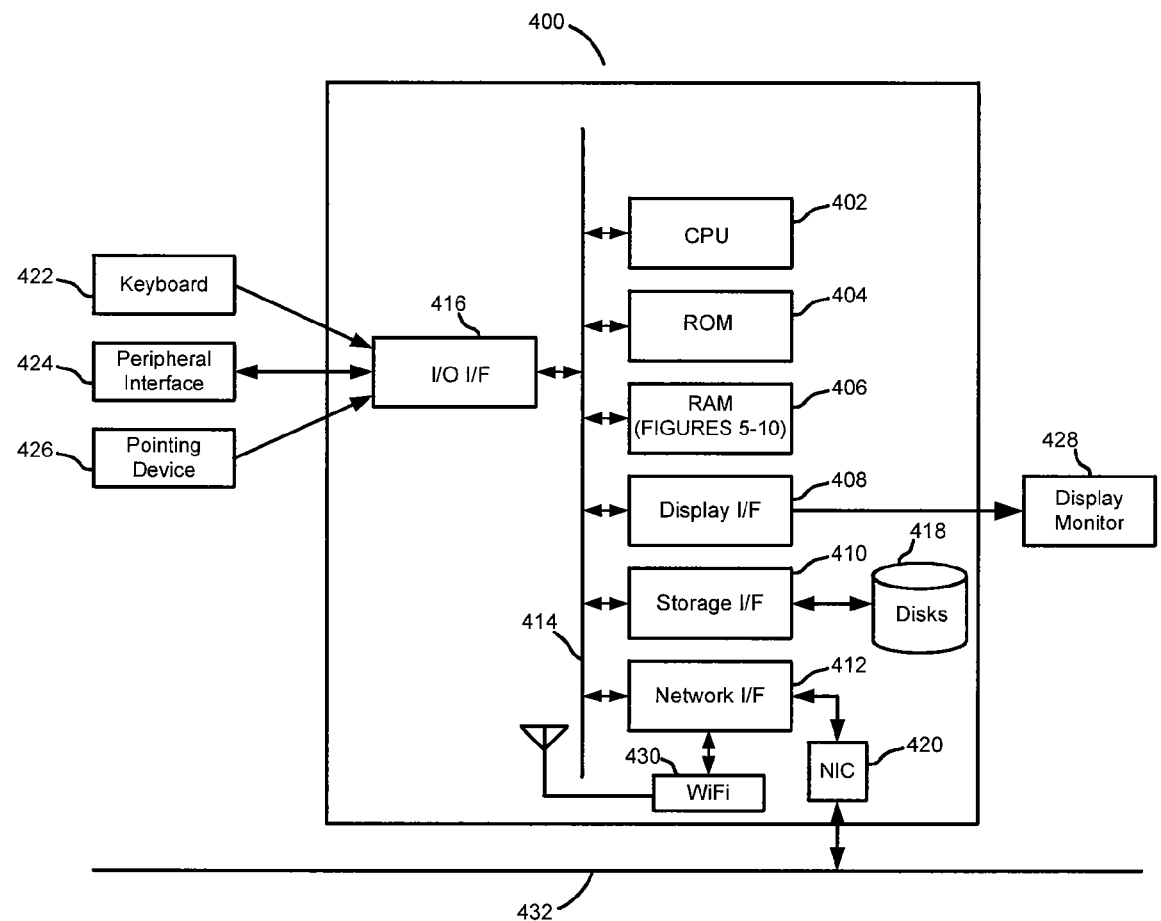
FIG. 4 is a block diagram illustrating a workstation for use in the system for compact representation of multiple markup data pages of electronic document data according to one embodiment of the subject application.

Turning now to FIG. 4, illustrated is a hardware diagram of a suitable workstation 400, shown in FIG. 1 as the user device 114, for use in connection with the subject system. A suitable workstation includes a processor unit 402 which is advantageously placed in data communication with read only memory 404, suitably non-volatile read only memory, volatile read only memory or a combination thereof, random access memory 406, display interface 408, storage interface 410, and network interface 412. In a preferred embodiment, interface to the foregoing modules is suitably accomplished via a bus 414.

The read only memory 404 suitably includes firmware, such as static data or fixed instructions, such as BIOS, system functions, configuration data, and other routines used for operation of the workstation 400 via CPU 402.

The random access memory 406 provides a storage area for data and instructions associated with applications and data handling accomplished by the processor 402.

The display interface 408 receives data or instructions from other components on the bus 414, which data is specific to generating a display to facilitate a user interface. The display interface 408 suitably provides output to a display terminal 428, suitably a video display device such as a monitor, LCD, plasma, or any other suitable visual output device as will be appreciated by one of ordinary skill in the art.

The storage interface 410 suitably provides a mechanism for non-volatile, bulk or long term storage of data or instructions in the workstation 400. The storage interface 410 suitably uses a storage mechanism, such as storage 418, suitably comprised of a disk, tape, CD, DVD, or other relatively higher capacity addressable or serial storage medium.

The network interface 412 suitably communicates to at least one other network interface, shown as network interface 420, such as a network interface card, and wireless network interface 430, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 420 is interconnected for data interchange via a physical network 432, suitably comprised of a local area network, wide area network, or a combination thereof.

An input/output interface 416 in data communication with the bus 414 is suitably connected with an input device 422, such as a keyboard or the like. The input/output interface 416 also suitably provides data output to a peripheral interface 424, such as a USB, universal serial bus output, SCSI, Firewire (IEEE 1394) output, or any other interface as may be appropriate for a selected application. Finally, the input/output interface 416 is suitably in data communication with a pointing device interface 426 for connection with devices, such as a mouse, light pen, touch screen, or the like.

In operation, an electronic document, inclusive of a plurality of objects, is first received. The electronic document is then parsed so as to generate a transparency table. The generated table includes entries corresponding to transparency characteristics of each of the objects. Each object is then processed in accordance with a corresponding transparency table entry. Thus, the received electronic document is thereby rendered so as to generate a rendered document.

In accordance with one example embodiment of the subject application, an electronic document having a plurality of objects is first received and parsed to generate a transparency stack corresponding to characteristics of each object. Thus, the skilled artisan will appreciate that when the electronic document received corresponds to an extensible markup language page specification (XPS) document, the objects include, for example and without limitation, canvases, elements, and the like. The received electronic document is then parsed so as to generate a transparency stack corresponding to characteristics of each object contained in the electronic document. A stack entry is then iteratively generated for each object, including objects that are nested in another object associated with the received electronic document. It will be apparent to those skilled in the art that the iterative generation of stack entries enables the maintaining of a record of the nested canvases and elements to indicate that a particular parent canvas contains any child elements that are transparent objects. In accordance with one embodiment of the subject application, a specific attribute, or characteristic, is used to indicate whether a particular element is to be rendered as opaque or transparent, e.g., an indicative flag.

A scan-line representation associated with each object in the received electronic document is then generated. It will be appreciated by those skilled in the art that the generated scan-line representation suitably corresponds to, for example and without limitation, an intermediate scan-line based representation of rendering operations of transparent objects and transparency groups in canvas rendering. In accordance with one embodiment of the subject application, when rendering operations are performed, two auxiliary scan-lines are generated for each group, one for the backdrop and one to render the newly created pixel information prior to blending colors between the two scan lines, as will be understood by those skilled in the art.

In the event that the object to be rendered is a tiled transparent object, which repeats itself a plurality of instances within the document, a first pixel map is generated corresponding to color data associated with each object and a second pixel map is then generated corresponding to opacity data associated with each object. Prior to creating the second pixel map, memory data, representing the available memory associated with creating the second pixel map, is then received and objects are selectively rendered based upon the available memory data. In accordance with one embodiment of the subject application, in the event that the tiled object exceeds a predetermined width and height constraint, the object is re-rendered a plurality of instances instead of creating pixel maps. Pixels, for which a rendering function has been performed, are then tracked and control of rendering operations is exerted based upon the tracked pixels. Thereafter, each object is processed in accordance with its corresponding transparency table entry. The received electronic document is then rendered by an associated document processing device 104.

In accordance with one particular example embodiment of the subject application, upon receipt of an electronic document, e.g., from a suitable software driver or application resident on the user device 114 by the controller 108 associated with the document processing device 104, or the like, the document is parsed via a suitable component of the document processing device 104. A transparency table, or stack, is then initialized corresponding to characteristics, or attributes, of each object contained in the electronic document. An opacity attribute is then set for the current object and a stack entry for the object is generated in the transparency stack. A determination is then made whether the object contains any nested elements. When nested elements are determined to be present, opacity attributes are set for each of the elements with corresponding stack entries included in the transparency stack. For example, a flag is set indicating the presence of opacity attributes within a canvas, associated with an element, or the like.

Continuing with such an example embodiment, when rendering transparent objects, a determination is first made whether or not the first object parsed is a canvas element. It will be appreciated by those skilled in the art that a canvas element groups other elements e.g., paths, glyphs or other canvas elements, together so as to either group the elements into units or to apply properties to each child or ancestor of the unit, e.g., opacity. When the first object parsed is a canvas element, a determination is made whether an opacity setting, or attribute, has been set. When such a determination is positive, a transparency group is generated. Thereafter, canvas elements are drawn using color and opacity attributes associated with the canvas.

When the opacity attribute has not been set, the canvas elements are drawn using color and opacity attributes associated with opaque objects. The transparency group is then terminated and a determination is made whether another canvas remains for processing. When another canvas is determined to be present, e.g., the received electronic document includes an additional canvas object, the custom opacity attribute associated with the object is read to determine the opaqueness setting. That is, the additional canvas object is analyzed to determine whether the flag indicating the presence of at least one transparent object is located and based upon that indication, a transparency group is first generated or the canvas elements are drawn using associated color and opacity attributes corresponding to the additional canvas.

When it is determined that no additional canvases remain in the received electronic document, a determination is made whether the recently processed canvas is to be drawn, or painted, on a previously processed canvas. Thereafter, the recently processed canvas is drawn on the previously processed canvas, or drawn on the background, in accordance with the determination made above.

In the event that the object parsed from the received electronic document is not a canvas object, a determination is made whether or not the element has opacity, i.e., the transparency associated with the element. When the element includes opacity features, the opacity attribute of the element is stored in a graphic state. When the element lacks an opacity setting indicating transparency, a determination is made whether the element includes brush opacity, as will be understood by those skilled in the art. When brush opacity is detected, the opacity value of the element is set in the suitable color space and the transparency is set in the rendering routine for the associated document rendering device 104. Following such setting operations, a determination is made whether or not the element is tiled, as will be understood by those skilled in the art. When it is determined that the element is not tiled, a scan-line representation of the element is populated and the opacity of the element is restored in the graphic state.

When the element is determined to be tiled, a further determination is made whether or not the tiled element has brush opacity. A negative determination results in the generation of a single pixel map, whereas a positive determination results in the generation of dual pixel maps, e.g., one for opacity and one for color. It will be appreciated by those skilled in the art that pixel maps, as used in the instant example, correspond to means for recording pixels that are not directly rendered to the final page representation. In accordance with one example embodiment of the subject application, the pixel maps are used for tiling patterns and forms, as well as for tiled images in a given page description language, e.g., the XPS specification. In the event that there exists pixel-wise opacity information, such as opacity values within the 0 and 1 range and excluding values of 0 and 1 or in the event that an alpha channel exists in the image, an associated opacity pixel map is generated. A scan-line representation of the element is then populated and the opacity of the element is restored in the graphic state.

In accordance with the preceding example embodiment of the subject application, when an image associated with the received electronic document is not a tiled image, a direct rendering path is used for outputting the electronic document. When the electronic document includes a tiled image, a determination is made as to the opacity of the image, e.g., whether the opacity falls within the 0 and 1 range referenced above. When the opacity value falls outside this range and an alpha channel does not exist in the image, a single pixel map is generated and rendering occurs using the single pixel map.

When the opacity value falls within the opacity range, a determination is made whether or not the image includes nested tiles. When there are no nested tiles within the tile image, a determination is made as to the size of the image being rendered. For example, when the size of the tiled image exceeds 600×800, a direct rendering path is used, so as to avoid memory exhaustion of the associated document processing device 104. When there are nested tiles, or when the image does not exceed a predetermined size, a single pixel map is generated. Thereafter, the controller 108 or other suitable component associated with the document processing device 104 determines whether system memory, or memory allocated for rendering, has been exhausted. When memory has been exhausted, the tiled image is rendered using the single pixel map. When memory remains available for rendering, a second pixel map is generated and the tiled image is rendered using dual pixel maps, e.g., one for color and one for opacity.

It will be appreciated by those skilled in the art that when rendering to the final page, color information in the first pixel map is blended with page color information using the associated second pixel map opacity information. The skilled artisan will appreciate that such decoupling of the opacity information enables the processing of images when memory exhaustion occurs, e.g., it remains possible to render the image, albeit without transparency effects. It will further be understood by those skilled in the art that larger images employ direct rendering techniques instead of such pixel map caching described above, to avoid the exhaustion of system memory resources.

Figure 5:
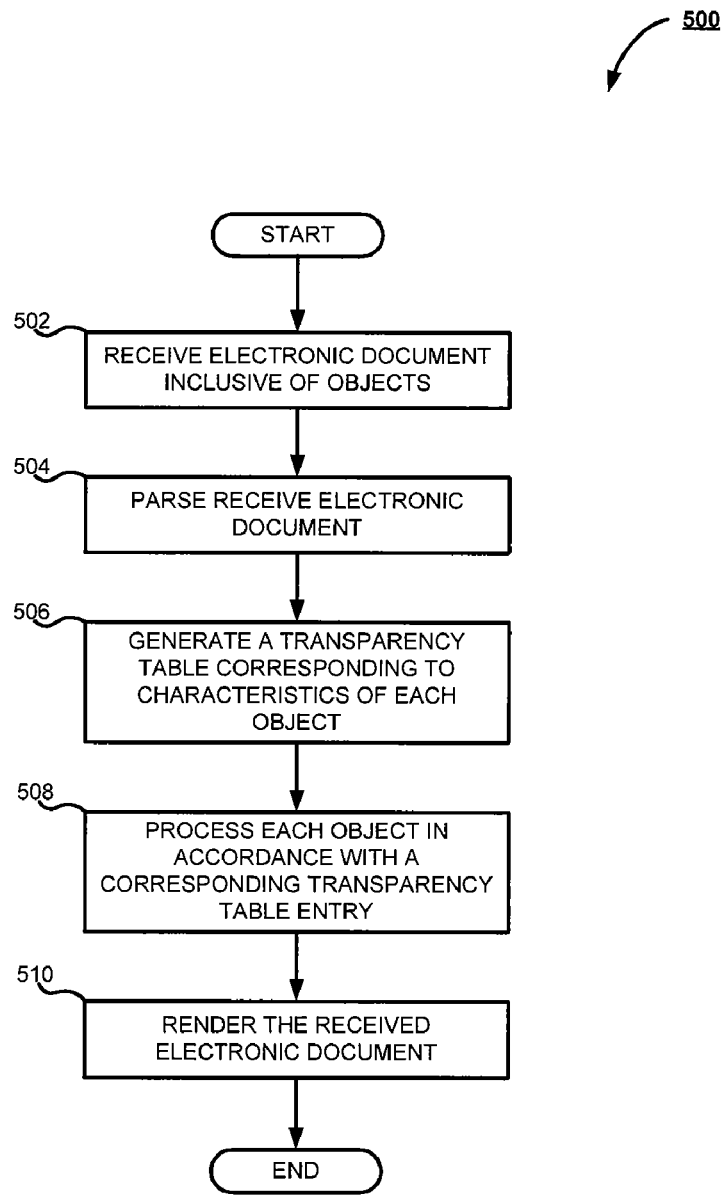
FIG. 5 is a flowchart illustrating a method for transparent object rendering according to one embodiment of the subject application.

The skilled artisan will appreciate that the subject system 100 and components described above with respect to FIG. 1, FIG. 2, FIG. 3, and FIG. 4 will be better understood in conjunction with the methodologies described hereinafter with respect to FIG. 5, FIG. 6, FIG. 7, FIG. 8, FIG. 9, and FIG. 10. Turning now to FIG. 5, there is shown a flowchart 500 illustrating a method for transparent object rendering in accordance with one embodiment of the subject application. Beginning at step 502, an electronic document, inclusive of a plurality of objects, is received. In accordance with one embodiment of the subject application, the electronic document is received from the user device 114 by the document processing device 104 via the computer network 102. The skilled artisan will appreciate that the electronic document corresponds to an electronic document in a suitable format, such as, for example and without limitation, a document in XPS format. At step 504, the electronic document is parsed via a suitable component, such as the controller 108, a raster image processor, a dedicated parser, or the like, associated with the document processing device 104.

At step 506 a transparency stack is generated corresponding to characteristics of each object associated with the parsed electronic document. Each object is then processed, at step 508, in accordance with a corresponding table entry. Thereafter, the received electronic document is suitably rendered, at step 510, by the document processing device 104 in accordance with the processed objects.

Figure 6:
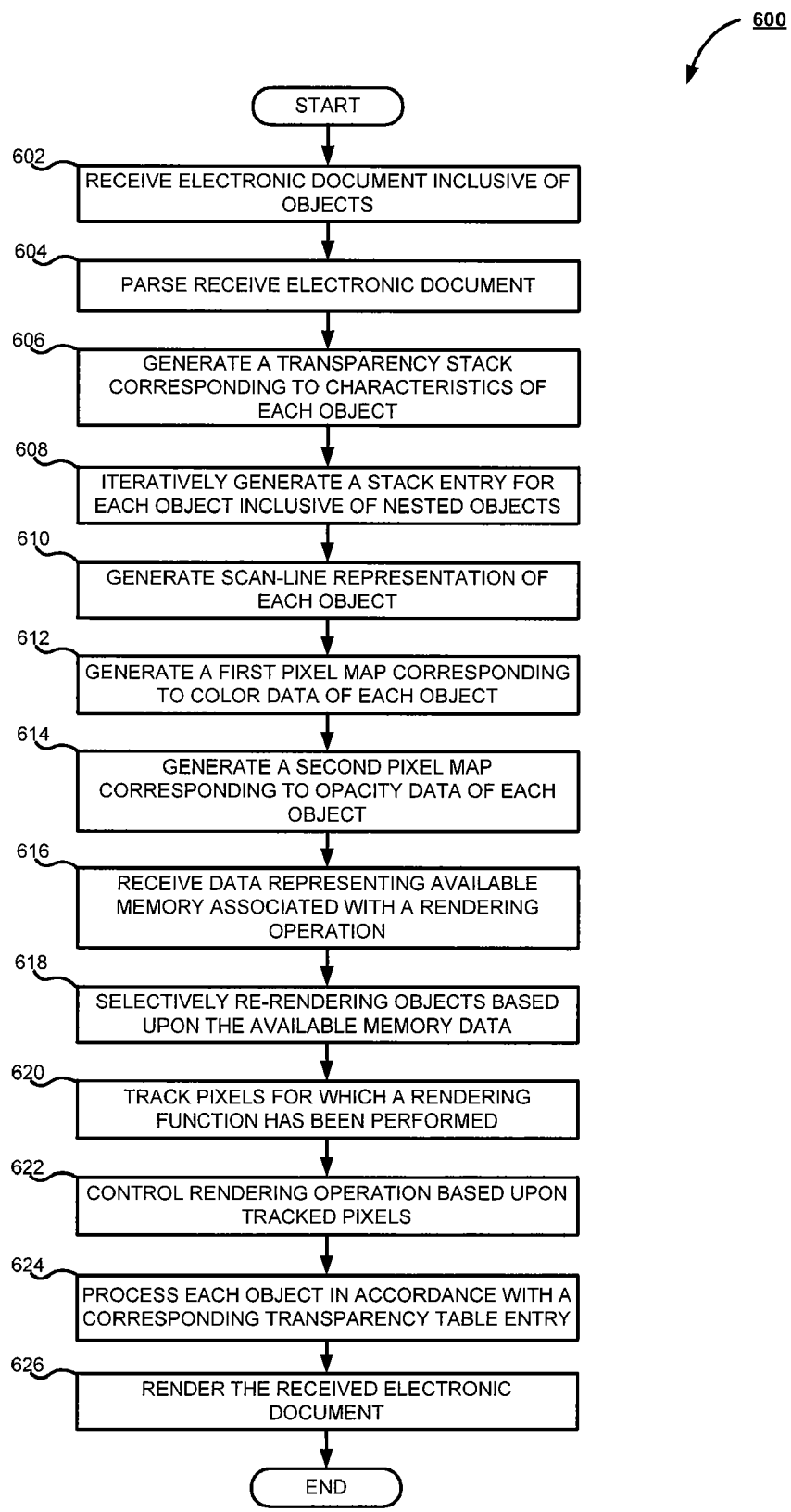
FIG. 6 is a flowchart illustrating a method for transparent object rendering according to one embodiment of the subject application.

Referring now to FIG. 6, there is shown a flowchart 600 illustrating a method for transparent object rendering in accordance with one embodiment of the subject application. The example implementation of FIG. 6 begins at step 602, whereupon an electronic document, inclusive of a plurality of objects, is received. Preferably, the electronic document is received in an XPS format, including objects associated with the document, such as, for example and without limitation, paths, glyphs, and canvases. The electronic document is then parsed, at step 604, via a suitable component associated with the document processing device 104. At step 606, a transparency stack is generated corresponding to characteristics associated with each object. A stack entry is then iteratively generated, at step 608, for each object, including nested objects. That is, for each object associated with the XPS document, including any objects nested within another object, a stack entry is generated in the transparency stack.

At step 610, a scan-line representation of each object is generated. If the object to be rendered is a tiled object, that repeats itself a plurality of instances within the document, a first pixel map is then generated at step 612 corresponding to color data associated with each object. A second pixel map is generated at step 614 corresponding to opacity data associated with each object. At step 616, data representing the available memory associated with a rendering operation is received. It will be appreciated by those skilled in the art that such available memory corresponds to system memory available for rendering operations on the document processing device 104. Objects are then selectively re-rendered at step 618 based upon the available memory. The document processing device 104, via the controller 108 or other suitable component associated therewith, then tracks pixels, at step 620, for which a rendering operation has been performed. Based upon the tracking, the controller 108 or other suitable component of the document processing device 104, controls the performance of rendering operations on the tracked pixels. At step 624, each object of the received electronic document is then processed corresponding to the transparency stack entries associated therewith. Thereafter, the electronic document is rendered at step 626.

Figure 7:
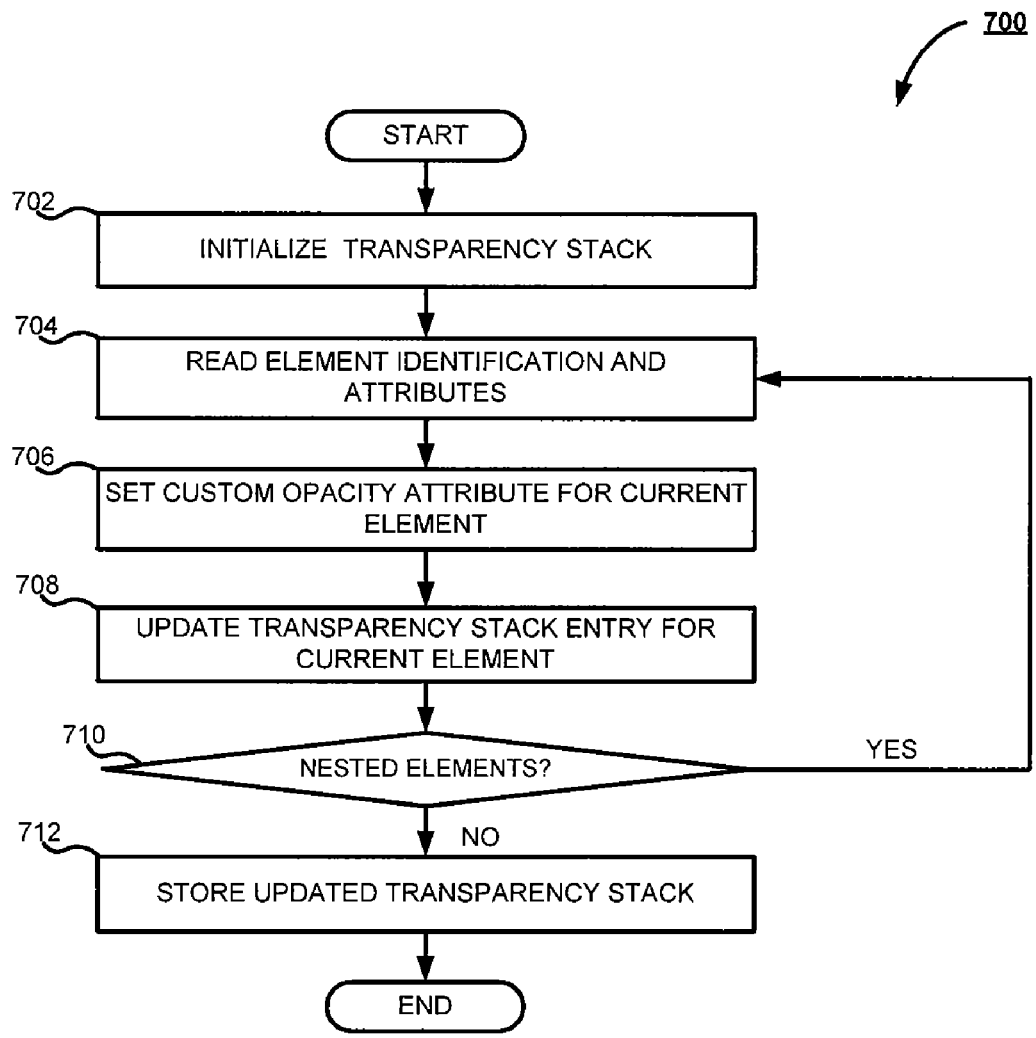
FIG. 7 is a flowchart illustrating a method for generating a transparency stack for transparent object rendering according to one embodiment of the subject application.

The preceding embodiments include various steps capable of expansion, as demonstrated in FIGS. 7, 8, 9, and 10. Turning now to FIG. 7, there is shown a flowchart 700 illustrating a method for generation of the transparency stack for use in the system for transparent object rendering according to one embodiment of the subject application. At step 702, a transparency stack is first initialized on the document processing device 104. Preferably, the stack is a table resident in memory associated with the controller 108, or other suitable component of the document processing device 104. At step 704, element identification data and corresponding attributes are read by, for example and without limitation, a raster image processor associated with the controller 108 of the document processing device 104. For each element, at step 706, a custom opacity attribute, e.g., a flag, is set indicating the presence of a transparent object in the corresponding element.

The transparency stack entry associated with each element is then updated, at step 708, to reflect the setting of the custom attribute. A determination is then made at step 710 whether the current element includes any nested elements. When a nested element is detected, flow returns to step 704, whereupon the element identification data and attribute data associated with the nested element is ascertained and a custom opacity attribute is set for the nested element at step 706.

Operations continue thereon, as set forth above, until, at step 710, no further nested elements are detected. Flow then proceeds to step 712, whereupon the updated transparency stack is suitably stored in memory associated with the document processing device 104 for use in future rendering operations.

Figure 8:
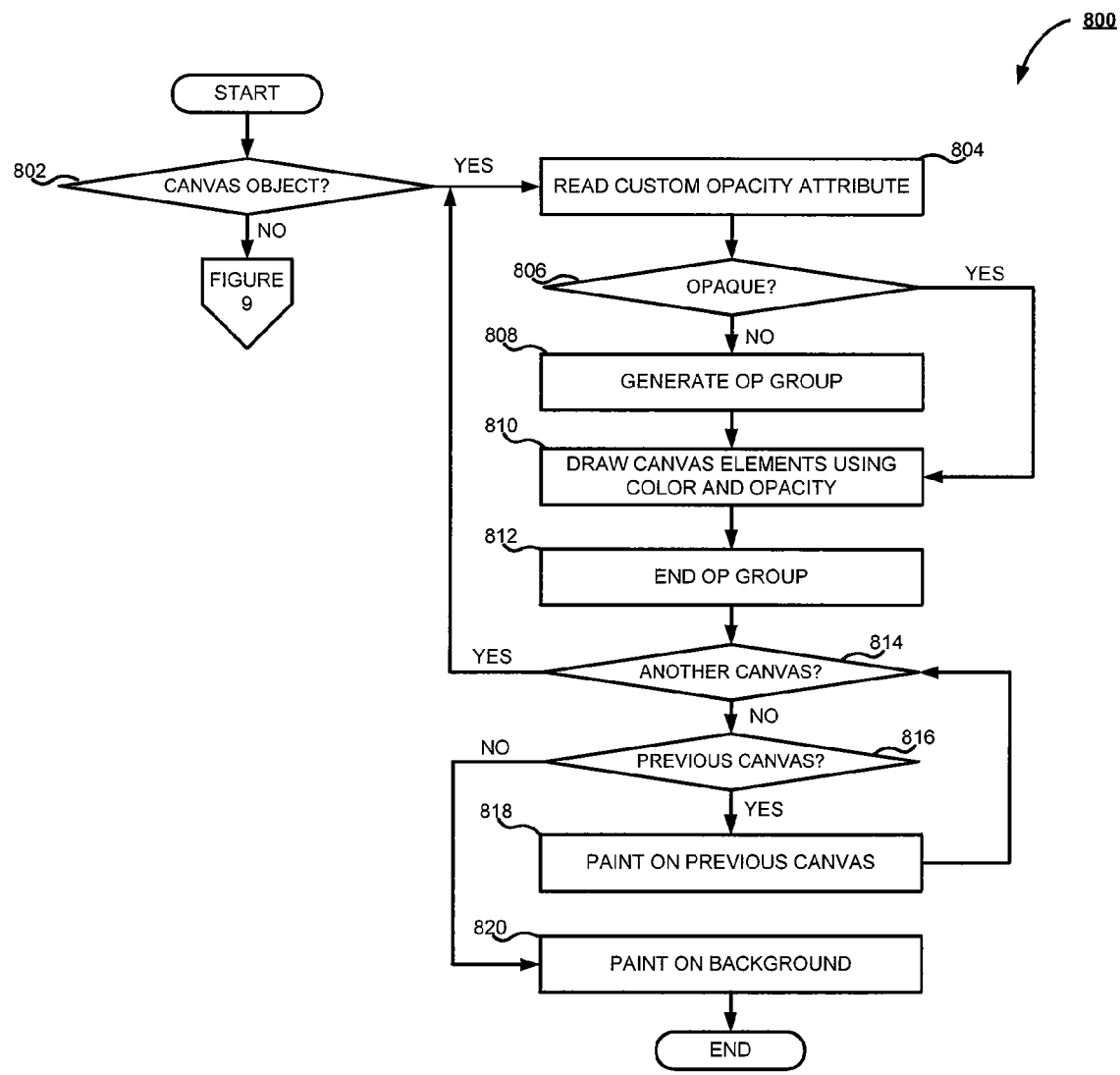
FIG. 8 is a flowchart illustrating a method for processing grouped elements in transparent object rendering according to one embodiment of the subject application.

Turning now to FIG. 8, there is shown a flowchart 800 illustrating a method for processing grouped elements in accordance with the system for transparent object rendering according to one embodiment of the subject application. A determination is first made, at step 802, whether an element of a received electronic document corresponds to a grouped element, e.g., a canvas element. When the element is not a canvas element, operations proceed to FIG. 9, described in greater detail below. When the element is a canvas element, flow proceeds to step 804, whereupon the custom opacity attribute, or flag, associated with the element is read to determine at step 806, whether transparent objects are resident in the canvas. When no transparent objects are detected within the canvas, flow progresses to step 810, whereupon the canvas elements are drawn using the color and opacity data associated therewith.

When it is determined at step 806 that the canvas includes a transparent component, flow proceeds to step 808, whereupon a transparency group is generated. It will be appreciated by those skilled in the art that as the electronic document suitably corresponds to an XPS document, the generated transparency group includes customized op codes associated with the processing or rendering of transparent objects. Thereafter flow proceeds to step 810, whereupon the canvas elements are drawn using the color data and opacity data associated with the canvas. The transparency group then terminates at step 812.

A determination is then made at step 814 whether another canvas remains to be processed. When another canvas object is detected, flow returns to step 804 and operations continue as set forth above. When another canvas object is not detected, flow proceeds to step 816, whereupon a determination is made as to whether the just processed canvas is to be painted on a previous canvas. A positive determination at step 816 prompts the painting of the canvas on a previously processed canvas at step 818. A negative determination at step 816 prompts the painting of the canvas on the final page at step 820.

Figure 9:
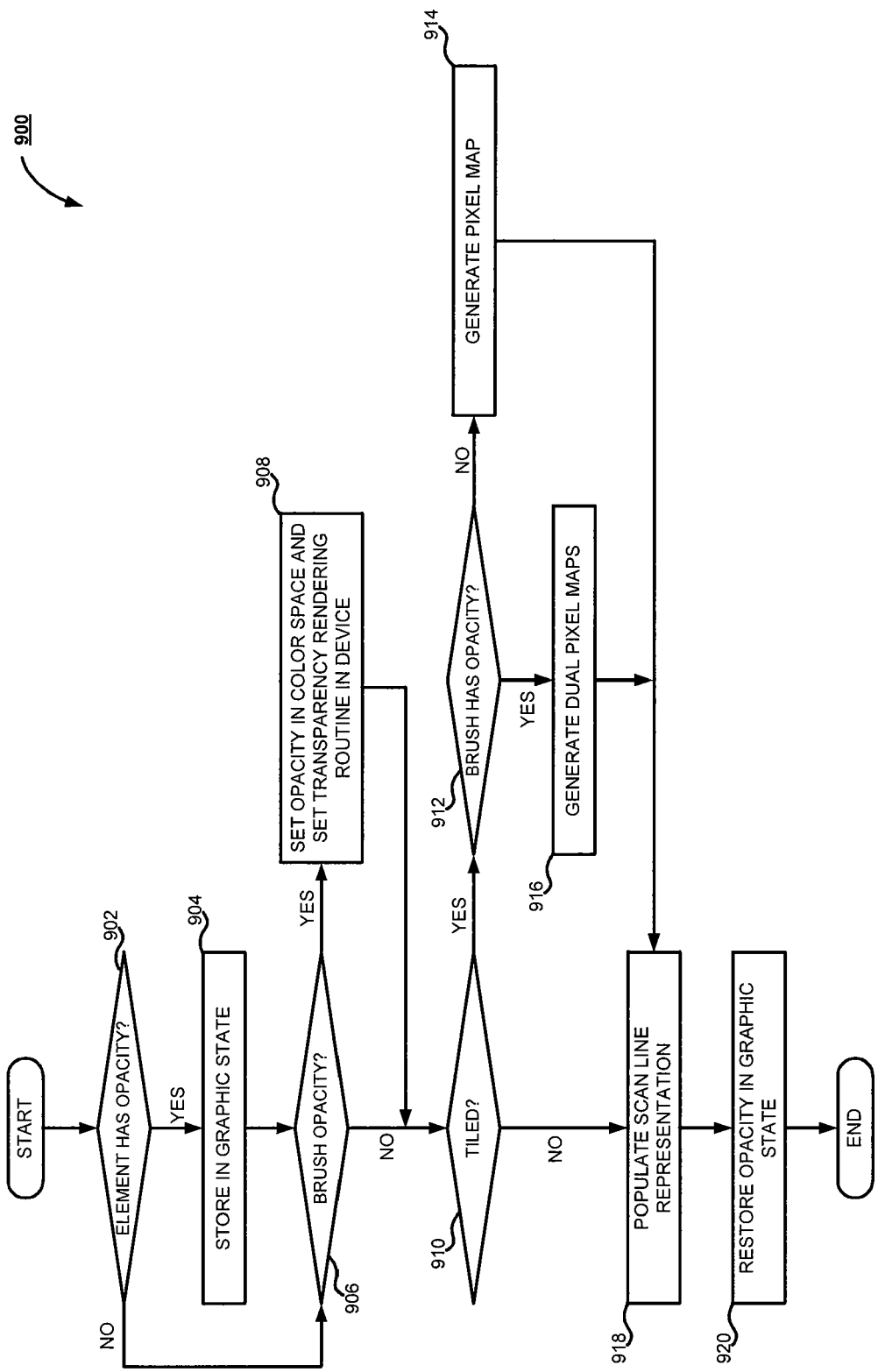
FIG. 9 is a flowchart illustrating a method for processing non-grouped elements in transparent object rendering according to one embodiment of the subject application.

Referring now to FIG. 9, there is shown a flowchart 900 illustrating a method for processing non-grouped elements in accordance with the system for transparent object rendering according to one embodiment of the subject application. From step 802 of FIG. 8, flow proceeds, upon a determination that the object is not a canvas object, to step 902 of FIG. 9. At step 902, a determination is made whether the element read from the received electronic document includes a transparent or opacity component. That is, whether or not the custom opacity attribute set for the element meets a predetermined range of opacity value indicating the presence of a transparent component of the element. A positive determination at step 902 prompts the storage of the opacity value of the element in a suitable graphic state at step 904, otherwise flow proceeds directly to step 906.

At step 906 a determination is made whether the element includes brush opacity, as will be understood by those skilled in the art. A positive determination at step 906 prompts the setting of the opacity in the appropriate color space and the setting of a transparency rendering routine in the document processing device 104 at step 908. Flow then proceeds to step 910. When the determination at step 906 indicates that no brush opacity is included, flow also proceeds to step 910, whereupon a determination is made whether the element is tiled. When the element is determined to be tiled, flow proceeds to step 912, whereupon a determination is made whether the brush has opacity. When the brush associated with the element does not have opacity, flow proceeds to step 914, whereupon a pixel map is generated. When the brush has opacity, flow progresses instead to step 916, wherein dual pixel maps are generated. When the element is not tiled, or following generation of one or more pixel maps, a scan-line representation of the element is populated at step 918. Thereafter, opacity value is restored at step 920 in the graphic state.

Figure 10:
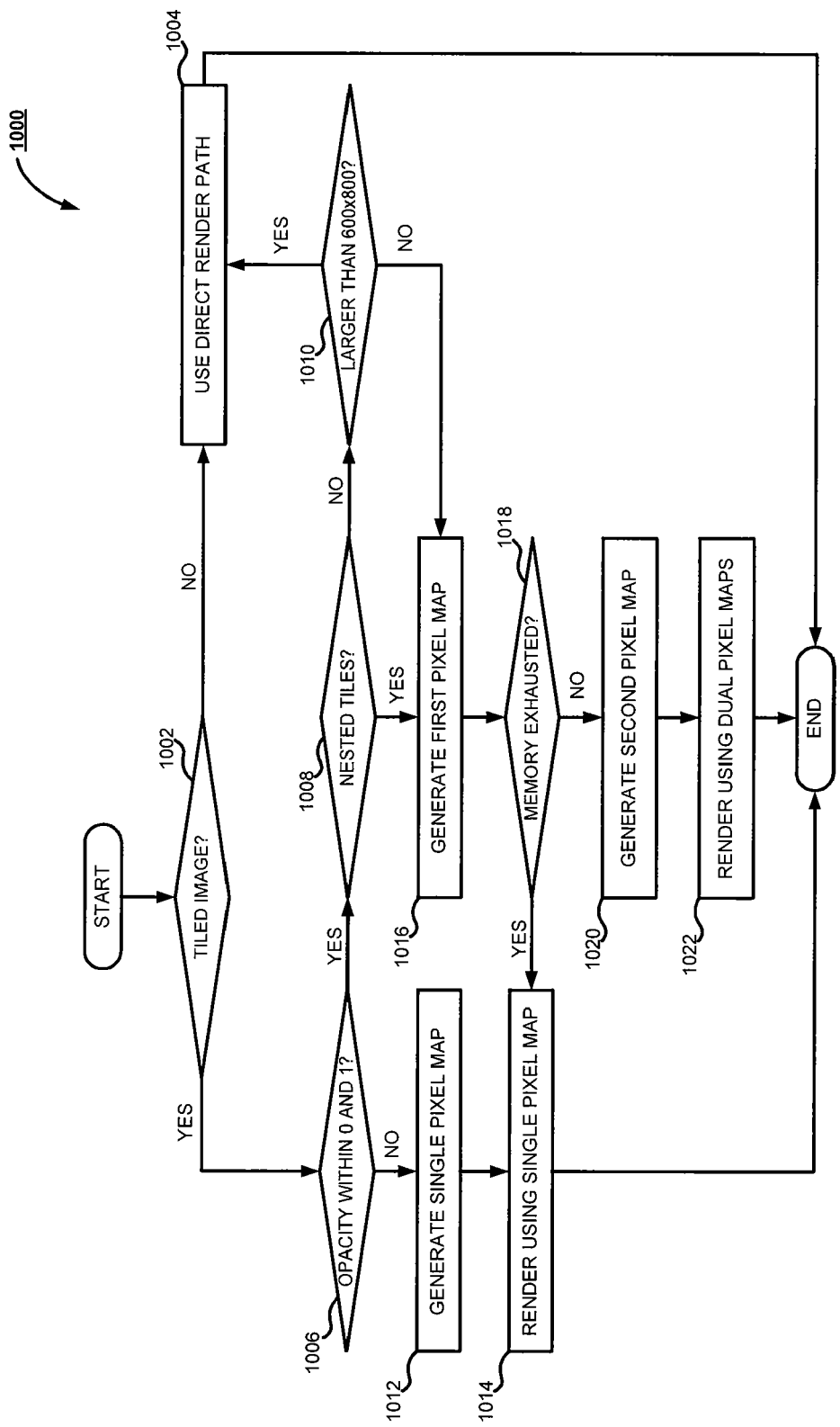
FIG. 10 is a flowchart illustrating a method for dual pixel map rendering in transparent object rendering according to one embodiment of the subject application.

Turning now to FIG. 10, there is shown a flowchart 1000 depicting a method for dual pixel map rendering of an image in accordance with the system for transparent object rendering according to one embodiment of the subject application. Following receipt of an image, which, as the skilled artisan will appreciate includes text, graphics, images, or the like, a determination is made at step 1002 whether the image is tiled, as will be understood by those skilled in the art. When it is determined that the received image is not a tiled image, flow proceeds to step 1004, whereupon a direct rendering path is used by the document processing device 104 and the electronic document is output in accordance with an associated document processing operation.

Upon a determination that the image corresponds to a tiled image, flow proceeds from step 1002 to step 1006. At step 1006, a determination is made whether the opacity value of the image is within the range of 0 and 1, without including either 0 or 1. A negative determination at step 1006 prompts the generations of a single pixel map at step 1012. Thereafter the image is rendered at step 1014 by the document processing device 104. When the opacity value falls within the predetermined range, e.g., 0 and 1, flow proceeds to step 1008, whereupon a determination is made whether the tiled image includes any nested tiles. When the image does not include any nested tiles a determination is made at step 1010 whether the image exceeds a predetermined size, e.g., 600×800. It will be appreciated by those skilled in the art that the reference to a large size of 600×800 is for example purposes only and other such predetermined sizes, based upon the available processing capabilities, amount of memory, or the like, associated with the document processing device 104, are capable of being used as a basis for the predetermined limiting size. When the image is large, i.e., greater than the predetermined size, flow returns to step 1004, and a direct rendering path is used to render the image.

When the image is not greater than the predetermined size, or when the image includes nested tiles, flow proceeds to step 1016, whereupon a first pixel map is generated. A determination is then made at step 1018 whether the memory available for rendering of the document processing device 104 has been exhausted. When the memory is exhausted, flow proceeds to step 1014, whereupon the image is rendered using a single pixel map. When the available memory has not been exhausted, as determined at step 1018, flow proceeds to step 1020, whereupon a second pixel map is generated, e.g., an opacity pixel map. Thereafter, at step 1022, the image is rendered by the document processing device 104 using the dual pixel maps.

The subject application extends to rendering of XPS opacity mask objects, by means of generating two transparency groups, one containing the object to be rendered and the other containing the alpha mask.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. Apparatus comprising a storage medium storing a rendering program having instructions which when executed by a processor will cause the processor to selectively render canvas objects, the instructions of the rendering program for:
   generating a transparency indicator for each of a plurality of canvas objects included in an electronic document dependent upon whether the respective canvas object includes or does not include transparency characteristics;
   generating a first pixel map corresponding to only the color data of each of the plurality of canvas objects and a second pixel map corresponding to opacity data of each of the plurality of canvas objects;
   selectively rendering each of the plurality of canvas objects using either transparency rendering functions or general rendering functions dependent upon the presence or non-presence of the transparency indicator corresponding to each of the plurality of canvas objects;
   receiving data representative of available memory associated with the rendering operation; and
   selectively re-rendering objects without reference to the second pixel map dependent upon available memory.

2. The apparatus of claim 1 further comprising instructions for generating a transparency group consisting of a scan-line representation of each of the plurality of canvas objects, the scan-line representation including a scan-line corresponding to an associated backdrop and a scan-line corresponding to associated pixel data for each of the plurality of canvas objects.

3. The apparatus of claim 1 further comprising instructions for:
   generating a first transparency group and a second transparency group; and
   rendering a plurality of opacity mask objects, wherein the first transparency group comprises at least one opacity value associated with the mask object and the second transparency group comprises at least one pixel color value of at least one object overlapping a corresponding opacity mask pixel location.

4. The apparatus of claim 1 further comprising instructions for:
   tracking pixels for which a rendering function has been performed; and
   controlling a rendering operation in accordance with the tracked pixels.

5. The apparatus of claim 1 wherein the transparency indicators for each of the plurality of canvas objects are determined by iteratively examining the plurality of objects contained within each of the plurality of canvas objects, including objects that are nested in another object, for the presence or non-presence of transparency characteristics and creating temporary stack by iteratively generating a stack entry for each canvas object.

6. A transparent object rendering method comprising:
   parsing a received electronic document, the electronic document inclusive of a plurality of canvas objects, wherein parsing includes generating a transparency indicator for each of a plurality of canvas objects dependent upon whether each of the canvas objects includes or does not include transparency characteristics;
   generating a first pixel map corresponding to only the color data of each of the plurality of canvas objects and a second pixel map corresponding to opacity data of each of the plurality of canvas objects;
   rendering the received electronic document by selectively rendering each of the plurality of canvas objects using either transparency rendering functions or general rendering functions dependent upon the presence or non-presence of the transparency indicator corresponding to each of the plurality of canvas objects;
   receiving data representative of available memory associated with the rendering operation; and
   selectively re-rendering objects without reference to the second pixel map dependent upon available memory.

7. The transparent object rendering method of claim 6 further comprising generating a transparency group consisting of a scan-line representation of each of the plurality of objects, the scan-line representation including a scan-line corresponding to an associated backdrop and a scan-line corresponding to associated pixel data for each of the plurality of canvas objects.

8. The transparent object rendering method of claim 6 further comprising:
   generating a first transparency group and a second transparency group; and
   rendering a plurality of opacity mask objects, wherein the first transparency group comprises at least one opacity value associated with the mask object and the second transparency group comprises at least one pixel color value of at least one object overlapping a corresponding opacity mask pixel location.

9. The transparent object rendering method of claim 6 further comprising:
   tracking pixels for which a rendering function has been performed; and
   controlling a rendering operation in accordance with an output based upon the tracked pixels.

10. The transparent object rendering method of claim 6 wherein the transparency indicators for each of the plurality of canvas objects are determined by iteratively examining the plurality of objects contained within each of the plurality of canvas objects, including objects that are nested in another object, for the presence or non-presence of transparency characteristics and creating a temporary stack by iteratively generating a stack entry for each canvas object.

11. A computer-implemented method for transparent object rendering comprising:

receiving an electronic document inclusive of a plurality of canvas objects;

parsing a received electronic document, including generating a transparency indicator for each of a plurality of canvas objects dependent upon whether each of the plurality of canvas objects includes or does not include transparency characteristics;

generating a first pixel map corresponding to only the color data of each of the plurality of canvas objects and a second pixel map corresponding to opacity data of each of the plurality of canvas objects;

rendering the received electronic document by selectively rendering each of the plurality of canvas objects using either transparency rendering functions or general rendering functions dependent upon the presence or non-presence of the transparency indicator corresponding to each of the plurality of canvas objects;

receiving data representative of available memory associated with the rendering operation; and selectively re-rendering objects without reference to the second pixel map dependent upon available memory.

12. The computer-implemented method for transparent object rendering of claim 11 further comprising generating a transparency group consisting of a scan-line representation of each of the plurality of objects, the scan-line representation including a scan-line corresponding to an associated backdrop and a scan-line corresponding to associated pixel data for each of the plurality of canvas objects.

13. The computer-implemented method for transparent object rendering of claim 11 further comprising:

generating a first transparency group and a second transparency group; and rendering a plurality of opacity mask objects, wherein the first transparency group comprises at least one opacity value associated with the mask object and the second transparency group comprises at least one pixel color value of at least one object overlapping a corresponding opacity mask pixel location.

14. The computer-implemented method for transparent object rendering of claim 11 further comprising:

tracking pixels for which a rendering function has been performed; and controlling a rendering operation in accordance with an output based upon the tracked pixels.

15. The computer-implemented method for transparent object rendering of claim 11 wherein the transparency indicators for each of the plurality of canvas objects are determined by iteratively examining the plurality of objects contained within each of the plurality of canvas objects, including objects that are nested in another object, for the presence or non-presence of transparency characteristics and creating a temporary stack, and by iteratively generating a stack entry for each canvas object.

* * * * *